(No Model.) 8 Sheets—Sheet 1.

C. H. TRASK.
MILLING MACHINE.

No. 521,771. Patented June 19, 1894.

WITNESSES.
A. P. Porter.
J. M. Dolan.

INVENTOR.
Chas. H. Trask
by his attys
Clarke & Raymond (No Model.)  8 Sheets—Sheet 2.

C. H. TRASK.
MILLING MACHINE.

No. 521,771. Patented June 19, 1894.

WITNESSES.
A. P. Porter
A. M. Dolan

INVENTOR (No Model.) 8 Sheets—Sheet 3.

C. H. TRASK.
MILLING MACHINE.

No. 521,771. Patented June 19, 1894.

WITNESSES
A. P. Porter.
J. M. Dolan.

INVENTOR
Chas. H. Trask
by his attys
Clarke & Raymond (No Model.) 8 Sheets—Sheet 5.
C. H. TRASK.
MILLING MACHINE.

No. 521,771. Patented June 19, 1894.

WITNESSES.
A. P. Porter
J. M. Dolon

INVENTOR.
Chas. H. Trask
by his attys
Clarke & Raymond (No Model.) 8 Sheets—Sheet 6.
C. H. TRASK.
MILLING MACHINE.
No. 521,771. Patented June 19, 1894.
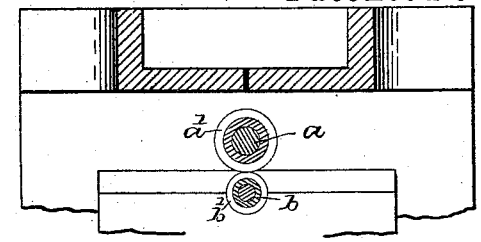
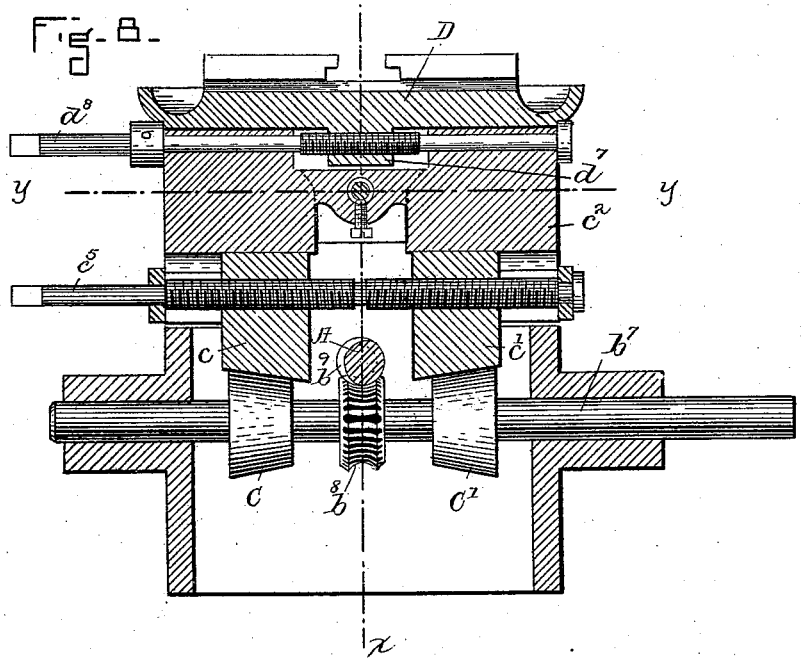
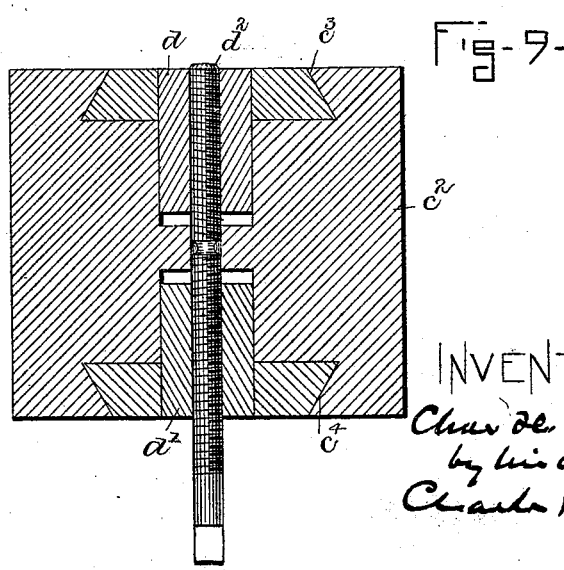
WITNESSES
A. P. Porter
J. M. Dolan
INVENTOR
Chas. H. Trask
by his attys
Charles K. Raymond (No Model.) 8 Sheets—Sheet 7.

C. H. TRASK.
MILLING MACHINE.

No. 521,771. Patented June 19, 1894.

WITNESSES.
A. P. Porter.
J. M. Dolan.

INVENTOR:
Chas. H. Trask
by his attys
Charles K. Raymond (No Model.) 8 Sheets—Sheet 8.

C. H. TRASK.
MILLING MACHINE.

No. 521,771. Patented June 19, 1894.

WITNESSES.
A. P. Porter
J. M. Dolan

INVENTOR.
Chas. H. Trask
by his attys
Charles H. Raymond

UNITED STATES PATENT OFFICE.

CHARLES H. TRASK, OF LYNN, MASSACHUSETTS.

MILLING-MACHINE.

SPECIFICATION forming part of Letters Patent No. 521,771, dated June 19, 1894.

Application filed March 3, 1890. Serial No. 342,342. (No model.)

*To all whom it may concern:*

Be it known that I, CHARLES H. TRASK, a citizen of the United States, residing at Lynn, in the county of Essex and State of Massachusetts, have invented a new and useful Improvement in Milling-Machines, of which the following is a full, clear, and exact description, reference being had to the accompanying drawings, forming a part of this specification, in explaining its nature.

This invention relates to the class of milling machines described in my application for Letters Patent of the United States filed July 11, 1889, Serial No. 317,217, and comprises devices for automatically backing off a single blank forming a rotary tool or cutter. The mechanism is in many respects like that described in my said application.

Figure 1:
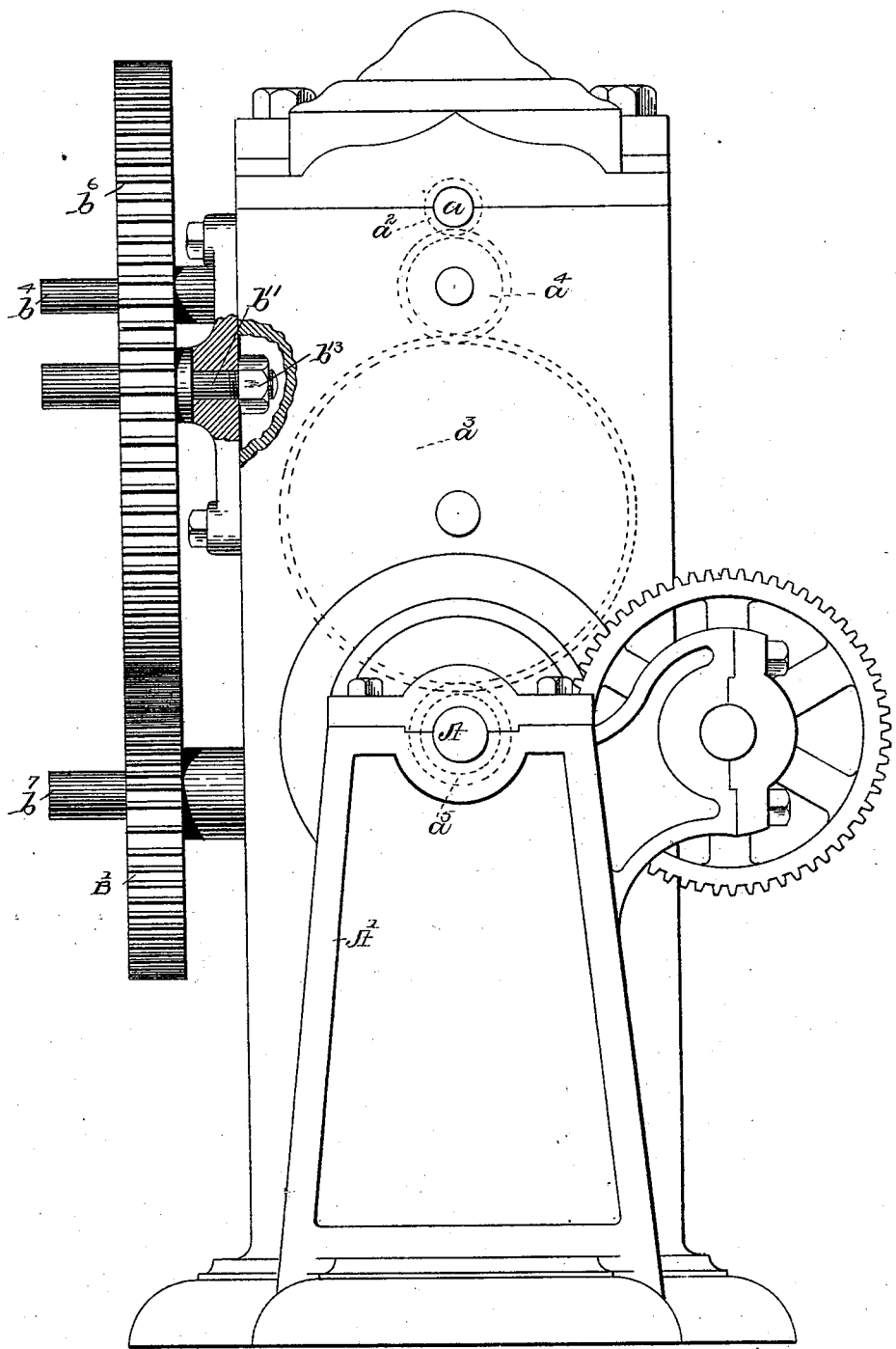
Figure 2:
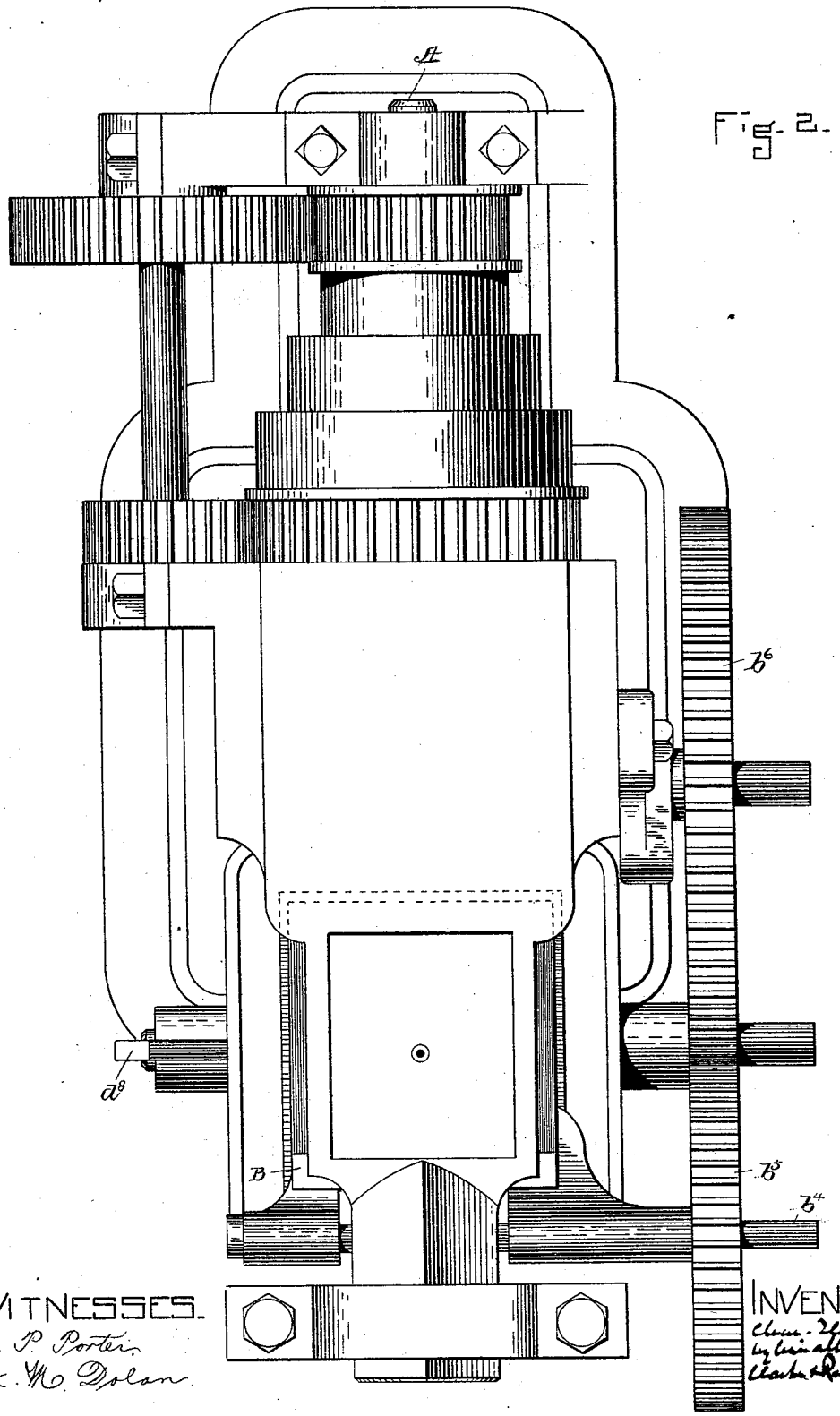
Figure 3:
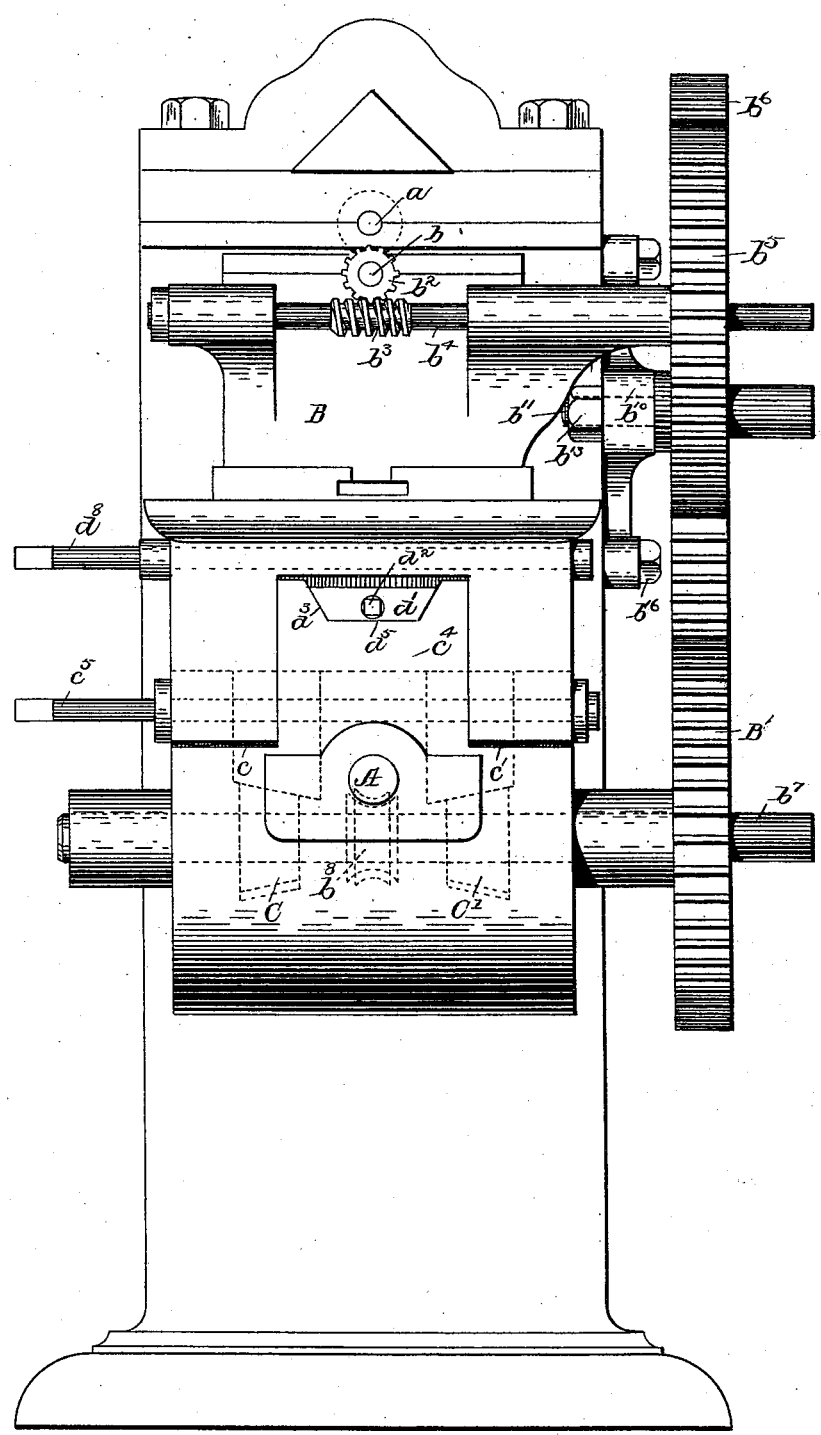
Figure 4:
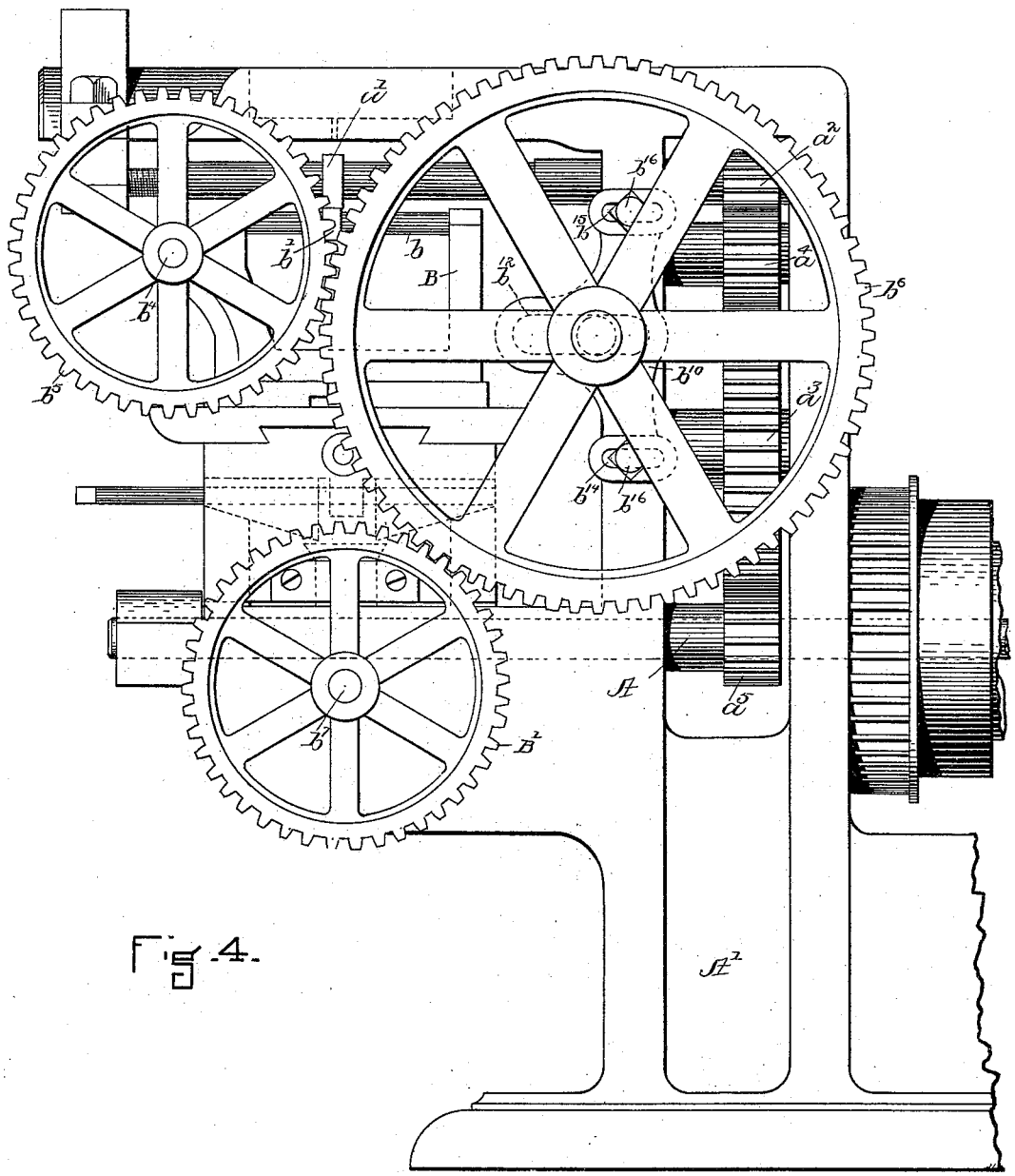
Figure 5:
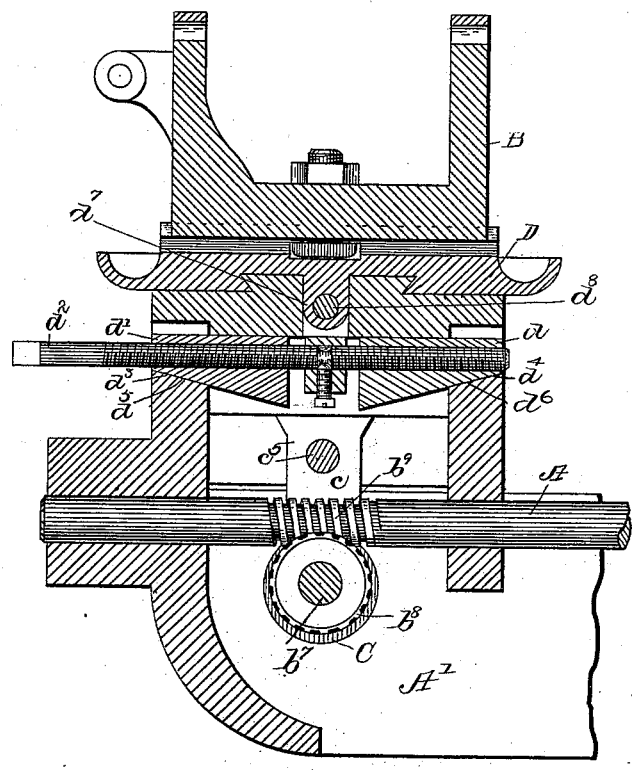
Figure 6:
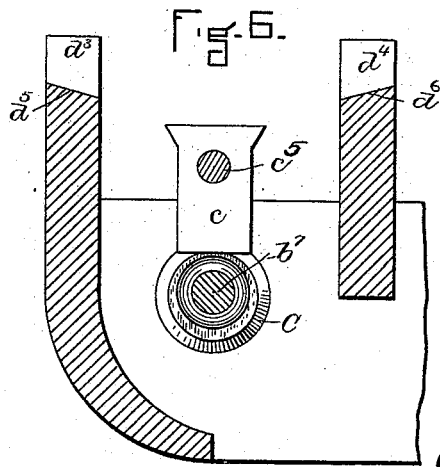
Figure 10:
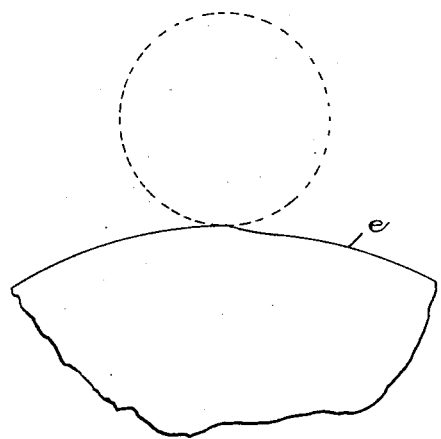
Figure 11:
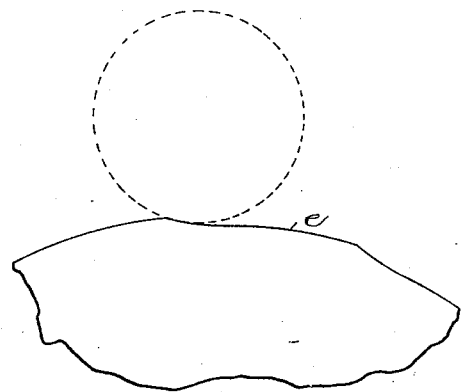
Figure 12:
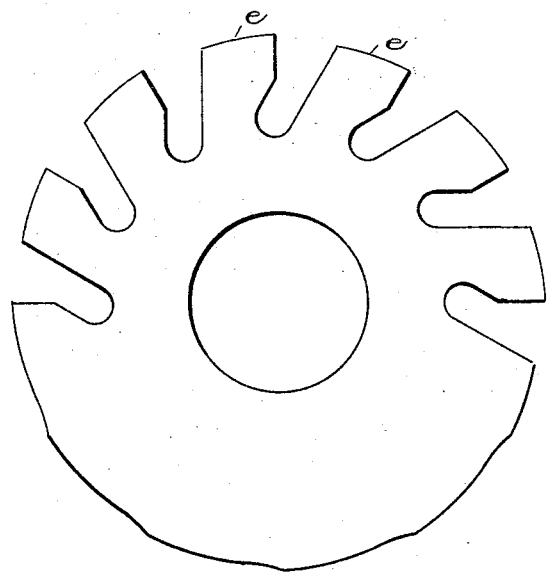
Figure 13:
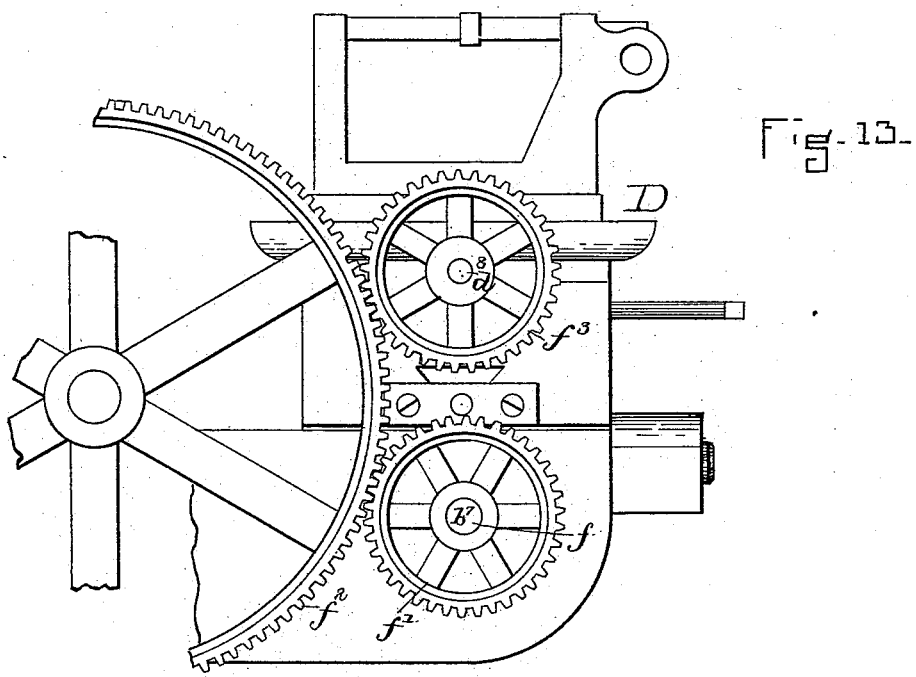
Figure 14:
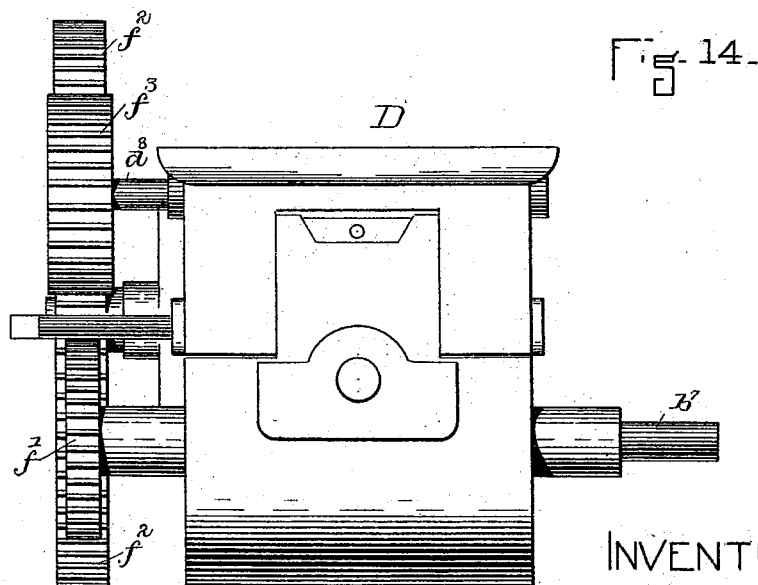

In the drawings,—Figure 1 is a view in rear elevation of a machine having the features of my invention. Fig. 2 is a view in plan. Fig. 3 is a view in front elevation. Fig. 4 is a view principally in side elevation. Fig. 5 is a view in vertical section upon the line $x\,x$ of Fig. 8. Fig. 6 is a detail view. Fig. 7 is a detail view in vertical section showing a means for oiling the milling cutters. Fig. 8 is a view in section at right angles to that shown in Fig. 5. Fig. 9 is a horizontal section upon the dotted line $y, y$, of Fig. 8. Fig. 10 shows the relation which the milling tool bears to the blank when the blank is in its lowest position in relation to the tool and at the beginning of the cutting of a relatively long inwardly extending tangential face. Fig. 11 represents the relation of the milling tool to the blank upon the completion of this cut but before the blank has dropped or moved away from the milling tool. Fig. 12 is a view in elevation of a partially completed cutter. Fig. 13 is a view in side elevation, and Fig. 14 is a view in end elevation of mechanism for automatically moving the bed supporting the arbor frame.

A is the main shaft of the milling machine. It is mounted in suitable bearings in the frame A', and it is connected with the shaft $a$ (see Fig. 1) upon which is mounted a milling tool $a'$ (see Fig. 4) by means of the pinion $a^2$ (see Figs. 1 and 4) and large intermediate gear $a^3$, small intermediate gear $a^4$, and pinion $a^5$ on the shaft A. The shaft $a$ has a suitable bearing in the frame of the machine. Below the shaft $a$ there is an arbor support box or frame B (see Figs. 3, 4, and 5) which supports the arbor $b$. This arbor supports or carries the tool blank $b'$ to be operated upon (see Fig. 4). The arbor has at one end a worm wheel $b^2$ which is engaged by the long worm $b^3$ (see Fig. 3) formed upon the shaft $b^4$ which has suitable bearings in the arbor box or frame B, and is rotated by means of the gear $b^5$ upon the worm shaft, the intermediate adjustable gear $b^6$, and the gear B' upon the shaft $b^7$ (see Figs. 3 and 4). The shaft $b^7$ has suitable bearings in the frame A' of the machine, and has a worm wheel $b^8$ (see Fig. 3) which is engaged by the worm $b^9$ upon the shaft A (see Fig. 5). The shaft A is the one upon which the pinion driving the milling tool shaft is mounted. The shaft $b^7$ also carries the cams C C' (see Figs. 3, 6, and 8). These cams are shaped or constructed substantially as represented in Figs. 6 and 8, and they serve to communicate vertical movement to the arbor box B, arbors carried thereby, and the tool blank. This movement is imparted to the arbor frame, arbor, and tool blank through the slide arms $c\,c'$, the lower ends of which bear upon the cams C C' respectively and extend downward from the table $c^2$ (see Fig. 8). This table moves in the dovetail guide sections $c^3\,c^4$ of the frame A' (see Figs. 3 and 9). The slide arms $c\,c'$ not only bear on the cam and impart vertical movement to the table $c^2$, but they are secured or attached to the table by a horizontal dovetail construction (see Figs. 4 and 8) which permits them to be moved toward and from each other by means of the right and left screw threaded shaft $c^5$, the right threaded section of the shaft extending into the threaded hole of one slide arm and the left threaded section of the shaft into a threaded hole of the other slide arm. This movement toward and from each other is given the slide arms $c\,c'$ for the purpose of adjusting the time of the elevation of the table $c^2$ and support B and of the tool blank carried thereby. Of course this movement of the slide arms toward and from each other would not effect this vertical adjustment unless the arms were shaped upon their lower ends as represented in Fig. 8 to any desired angle or inclination to a horizontal line, and the cams were also provided with an inclined surface of similar angle whereby upon the movement of the slides upon the cam surfaces toward each other the table $c^2$ is lowered, and away from each other the table is elevated. The table $c^2$ has provision for changing the elevation of the bed D upon which the arbor frame or support B rests. This is effected by means of the wedge adjusting blocks $d\ d'$ (see Fig. 5) and the right and left threaded screw shaft $d^2$ which actuates the wedge blocks $d\ d'$ to move them toward or from each other. These wedge blocks extend into wedge guiding recesses $d^3\ d^4$ in the tops of the dovetail projections $c^3\ c^4$ extending upward from the frame A' (see Figs. 3 and 5) and bear upon the inclined bottoms $d^5\ d^6$ of said recesses. The table $c^2$ also carries a threaded shaft $d^8$ which passes through a nut formed in the section $d^7$ of the bed D, by means of which the bed D and the arbor support are moved horizontally in relation to the bed $c^2$ (see Fig. 8). The arbor support or frame B is secured to the bed D in any of the well known ways. These adjustments, namely the vertical adjustment and the horizontal adjustment, are provided for the purpose of bringing the tool blank to be operated upon into proper relation to the milling tool before the machine is started, and also for the purpose of providing means whereby tool blanks varying in size or diameter may be operated upon. After the proper adjustments, the automatic operation of the machine is practically confined to the rotation of the milling tool, the rotation of the arbor and tool blank carried thereby, and the vertical movement of the tool blank in relation to the milling tool due to the operation of the cams C C'. The tool blank and consequently the arbor and the arbor frame are given as many vertical movements in relation to the milling tool as there are teeth in the tool blank to be backed off; for instance, if it were intended to provide the tool blank with fifteen teeth, then the tool blank would be moved upward and downward fifteen times in relation to the milling tool, the rotary movement of the tool blank continuing of course during these movements. To vary the number of vertical movements to each full revolution of the tool blank arbor the gears $b^5\ b^6$ are changed for others, as hereinafter specified.

It will be noticed that the tool blank is provided with a vertical movement in relation to its shaping milling tool, and also with a slow rotary movement, the upward vertical movement continuing during the backing off or removing of a section of the tool blank and the forming upon the edge of the tool blank a rounded or curved surface which extends from its edge inward tangentially to any desired extent according to the number of teeth which the tool blank is to have and the amount of backing off required, and the cams C C' are shaped to cause or permit a quick return or downward movement of the tool blank, arbor support, &c., upon the completion of the backing off of each tooth, and the slow rotation of the arbor is not stopped. The effect of this operation is to produce upon the tool blank a series of curved faces $e$ (see Figs. 10 and 11). The position which the milling tool bears to the tool blank at the beginning of the shaping operation is represented in Fig. 10, and at the end but before the drop or downward movement of the tool blank in Fig. 11. The vertical adjustment by means of the slide arms $c\ c'$ is for the purpose of varying the extent of the drop or vertical movement of the arbor and tool blank in relation to the milling tool; the second vertical adjustment, or that obtained by the wedge blocks $d\ d'$ is for the purpose of enabling tool blanks varying in diameter to be worked upon the same machine.

In Fig. 4 I have shown the gear $b^5$ upon the shaft $b^4$ connected with a driving gear B' by means of an intermediate gear mounted upon a shaft which is nearly parallel horizontally with the said shaft $b^4$. This is for the purpose of enabling the gear $b^5$ to rise and fall with the arbor frame to which it is attached without varying the relation of its teeth to the driving gear, so that whatever the vertical position of the said gear $b^5$ may be its teeth always mesh well with the teeth of the gear $b^6$. To enable the speed of the worm shaft to be varied, the gear $b^6$, is represented as mounted upon a bracket $b^{10}$ by means of a slide stub $b^{11}$ (see Fig. 1) arranged to slide in a slot $b^{12}$ in said bracket, and having a nut $b^{13}$ by which it is firmly secured in any desired position to said bracket, and which stud $b^{11}$ carries the gear. The bracket is also adapted to be moved to vary the inclination of the slot $b^{12}$ by means of slots $b^{14}\ b^{15}$, one in each end of the vertical section of the bracket, and the bolts $b^{16}$ which pass through said slots and nuts thereon.

In Figs. 13 and 14 I have shown the bed D as automatically moved by connecting the threaded shaft $d^8$ with the driving shaft. It is necessary to move the bed D and the arbors horizontally at the beginning of each operation of the machine upon a tool blank in order that the tool blank when it is brought into position beneath the milling tool may have its periphery shaped to the shape of the milling tool, and from that point the backing off action of the milling tool begins. To provide this automatic movement I mount upon the end $f$ of the cam shaft $b^7$ a gear $f'$ which meshes with the intermediate gear $f^2$, and this gear $f^2$ in turn meshes with the broad faced gear $f^3$ upon the screw shaft $d^8$. The intermediate gear if desired may be given the same adjustments in relation to the gears $f'$ and $f^3$ and by the same means as the intermediate gear $b^6$ above described. Of course it is understood that the horizontal movement of the bed D is not continued after the center of the tool blank is brought into vertical line with the center of the milling tool.

Having thus fully described my invention,

I claim and desire to secure by Letters Patent of the United States—

1. The combination of the main shaft of the machine, the shaft $a$ carrying a milling tool and connected with the main shaft, an arbor for supporting a tool blank, the arbor support B, an arbor rotating device supported by the arbor frame, its gear $b^5$ a driving gear operated by the main shaft, and an adjustable intermediate gear connecting the said driving gear and the gear $b^5$ upon the arbor frame, to permit the vertical movement of the arbor frame operating gear, as and for the purposes described.

2. The combination with the main shaft of the machine, the shaft $a$ carrying a milling tool and connected with the main shaft, an arbor for supporting a tool blank, the arbor frame, means for communicating vertical movements to said frame, an arbor rotating device supported by said frame, its gear $b^5$, a driving gear operated by the main shaft, an adjustable intermediate gear connecting the said driving gear and the gear $b^5$ to permit of the vertical movement of the gear $b^5$, and an adjustable spindle or shaft on which said intermediate gear is mounted to turn, substantially as described.

3. The combination with the main shaft of the machine, the shaft $a$ carrying a milling tool and connected with the main shaft, an arbor for supporting a tool blank, the arbor frame, means for communicating vertical movements to the said frame, an arbor rotating device supported by said frame, its gear $b^5$, a driving gear operated by the main shaft, an intermediate gear connecting the said driving gear and the gear $b^5$ to permit of the vertical movement of the gear $b^5$, a spindle or shaft on which said intermediate gear is mounted to turn, and a bracket having a slot $b^{12}$ in which said spindle or shaft is adjustably secured, the said bracket having also in its ends slots for the passage of the securing bolts, and the said slots permitting the bracket to be moved to vary the inclination of the slot $b^{12}$, substantially as described.

4. The combination with the main shaft of the machine, the shaft $a$ carrying a milling tool and connected with the main shaft, an arbor for supporting a tool blank, the arbor frame, means for communicating vertical movements to the said frame, an arbor rotating device supported by said frame, its gear $b^5$, a driving gear operated by the main shaft, an intermediate gear connecting the said driving gear and the said gear $b^5$, to permit of the vertical movement of the gear $b^5$, a spindle or shaft on which said intermediate gear is mounted to turn, and a bracket having a slot $b^{12}$ in which said spindle or shaft is adjustably secured, substantially as described.

CHARLES H. TRASK.

Witnesses:
F. F. RAYMOND, 2d,
J. M. DOLAN.